United States Patent [19]

Miller

[11] Patent Number: 4,798,727

[45] Date of Patent: Jan. 17, 1989

[54] SOLID ANIMAL FEED SUPPLEMENT AND METHOD FOR ITS PRODUCTION

[75] Inventor: Alex E. Miller, Placentia, Calif.

[73] Assignee: Union Oil Company of California, Los Angeles, Calif.

[21] Appl. No.: 828,149

[22] Filed: Feb. 7, 1986

[51] Int. Cl.$^4$ ................................................ A23K 1/22
[52] U.S. Cl. ....................................... 426/69; 426/74; 426/626; 426/658; 426/807
[58] Field of Search ................... 426/69, 74, 623, 626, 426/630, 636, 807

[56] References Cited

U.S. PATENT DOCUMENTS

| | | | |
|---|---|---|---|
| 2,566,549 | 9/1951 | Beckwith et al. | 426/74 |
| 2,611,702 | 9/1952 | Potishman | 426/73 |
| 2,843,492 | 7/1958 | Bart et al. | 426/648 |
| 2,967,106 | 1/1961 | Kviesitis | 426/658 |
| 2,991,179 | 7/1961 | Kviesitis et al. | 426/658 |
| 3,121,634 | 2/1964 | Kichline et al. | 426/74 |
| 3,165,413 | 1/1965 | Weber et al. | 426/658 X |
| 3,244,527 | 4/1966 | Baker et al. | 426/2 |
| 3,246,336 | 4/1966 | Baribo et al. | 426/2 |
| 3,420,672 | 1/1969 | Appleman | 426/658 |
| 3,464,824 | 9/1969 | Jensen et al. | 426/285 |
| 3,505,073 | 4/1970 | Bode | 426/48 |
| 3,720,522 | 3/1973 | Nakagami | 426/120 |
| 4,016,296 | 4/1977 | DeSantis | 426/69 |
| 4,027,043 | 5/1977 | Schroeder et al. | 426/807 X |
| 4,061,728 | 12/1977 | Graham et al. | 424/442 |
| 4,062,988 | 12/1977 | DeSantis et al. | 426/807 X |
| 4,160,041 | 7/1979 | Schroeder | 426/807 X |
| 4,171,385 | 10/1979 | Skoch et al. | 426/623 X |
| 4,171,386 | 10/1979 | Skoch et al. | 426/658 |
| 4,221,818 | 9/1980 | Schroeder | 426/807 X |
| 4,234,608 | 11/1980 | Linehan | 426/807 X |
| 4,265,916 | 5/1981 | Skoch et al. | 426/74 |

FOREIGN PATENT DOCUMENTS

| | | |
|---|---|---|
| 263695 | 6/1964 | Australia . |
| 438073 | 1/1972 | Australia . |
| 460390 | 8/1973 | Australia . |
| 170505 | 6/1982 | New Zealand . |
| 1356954 | 6/1974 | United Kingdom . |

OTHER PUBLICATIONS

Grosso et al., "Calcium Chloride in Liquid Feed Supplements" NFIA Counter '73, Oct. 1973, pp. 115–129.
"Dehydration of Molasses" by Takeshi Miki, et al., Chemical Abstracts, vol. 70, 1969, p. 104 (79348W).

*Primary Examiner*—R. B. Penland
*Attorney, Agent, or Firm*—Greg Wirzbicki

[57] ABSTRACT

An acidic molasses-based liquid animal feed supplement including nutritionally appropriate phosphorus and magnesium and, optionally, non-protein nitrogen, is hardened into a solid form by the addition of a small amount of a soluble calcium compound, preferably calcium chloride, so that the calcium to magnesium weight ratio is between about 1.5 and 3. The disclosed solid animal feed supplement is sufficiently palatable to permit its free choice feeding, yet discourages overfeeding by its hardness and acidity. The block contains sufficient molasses to help meet the energy requirements for maintenance and weight gain of grazing animals, but is sufficiently low in pH to minimize the risk of ammonia poisoning due to breakdown of non-protein nitrogen sources to free ammonia during rumination.

17 Claims, 4 Drawing Sheets

SOLID ANIMAL FEED SUPPLEMENT AND METHOD FOR ITS PRODUCTION

BACKGROUND OF THE INVENTION

This invention relates to a method for making an animal feed supplement and, in particular, a molasses-based animal feed supplement in solid, block form.

The value of molasses-containing supplements as a palatable carbohydrate source and nutrient vehicle in animal diets has been recognized for many years. Phosphoric acid has often been added to the molasses supplement to serve as a preservative and as a source of dietary phosphorus. Urea has been added to animal feed supplements to supply non-protein nitrogen, and fats and vitamins have also been included as ingredients in animal feed supplements. Molasses-based feed supplements are particularly valuable fed either "free-choice" to grazing cattle or to stock in confinement where feed mixing facilities are lacking. (Free-choice feeding allows the animal to consume from a conveniently placed reservoir of liquid or solid supplement according to need.) Consumption during free-choice feeding is controlled by use of a lick wheel with liquids or by varying the hardness of a feed block, both means limiting the animal's ease of feeding. Controlling palatability of the feed block by chemical means also limits consumption.

Solid animal feed supplements have been prepared from molasses and other ingredients to augment the dietary requirements of animals, especially cattle, when forage is scarce or of low quality, for example, during the summer months in California and summer through winter in the Pacific Northwest. Solid feed blocks offer the advantage of free choice feeding of cattle, thereby reducing the labor and expense otherwise incurred to mix the feed supplement with the cattle's feed ration. Molasses blocks have been manufactured by compressing ingredients into a molded shape or by evaporative heating of the ingredients. Both of these methods have certain disadvantages. For example, energy-supplying ingredients, such as molasses, and heat-sensitive vitamins (if added) may degrade during heating to the temperature necessary to evaporate water.

Additional dietary requirements develop during the seasonal periods when grasses are growing rapidly, usually in the spring of the year. During these periods, the magnesium content of grazing grasses is so low that a condition of hypomagnesemia, commonly known as "grass tetany," often develops in grazing herds. The condition manifests itself in the animal staggering or going into convulsions, and hypomagnesemia can even cause death in severe cases. The situation is worsened if a high nitrogen or potassium-content fertilizer is applied to the grassland to encourage plant growth since uptake of magnesium from the soil is thereby depressed.

To counteract the nutritional effects upon grazing herds of grasses with low magnesium content, animal feed supplements in the form of a liquid or a solid block containing molasses and a concentration of magnesium additive sufficient to overcome dietary deficiencies of the nutrient have been provided. Animal feed blocks containing molasses and magnesium as a nutritional supplement have been disclosed by U.S. Pat. No. 4,234,608 to Linehan wherein magnesium oxide and dicalcium phosphate are reacted in molasses-containing solution to form a solid feed block. U.S. Pat. Nos. 4,171,385, 4,171,386 and 4,265,916 to Skoch, et al. also incorporate magnesium oxide as a nutritional source with or without the use of ferrous sulfate as an additional blocking agent to form a moldable mixture. However, magnesium oxide is highly alkaline and only sparingly soluble in molasses so that mixing of solutions containing magnesium oxide to maintain uniform dispersion requires great expenditures of energy. Moreover, magnesium oxide, because of its sparing solubility in molasses solutions, reacts slowly with phosphate so that gelation requires at least one hour and more commonly several hours.

As magnesium oxide is a highly basic substance, the animal feed supplements incorporating it as a source of magnesium ions are usually highly basic, having a pH in the range from about 9.5 to 11 pH units. A particular disadvantage of alkaline animal feed supplements containing nitrogen sources, such as urea, is that grazing animals tend to produce free ammonia from such feed during rumination. In a high pH environment, sufficient free ammonia can be produced from the nitrogen source in the rumen of the animal to cause ammonia poisoning leading to death.

In U.S. Pat. No. 4,027,043, animal feed supplements are disclosed which are prepared by mixing a phosphate source and an aluminum or an alkaline earth metal ingredient with molasses to solidify the resultant mixture at an acidic pH. This patent discloses that the combination of a soluble phosphate or phosphoric acid, at from 0.5 to 5 weight percent $P_2O_5$, and an oxide or salt of aluminum, magnesium, calcium or mixture thereof, at from 0.5 to about 5 weight percent (expressed as the oxide) will solidify molasses.

The use pf calcium chloride in liquid molasses-based supplements for cattle and its effect upon solidification has been investigated by Grosso and Nelson. (See "Calcium Chloride in Liquid Feed Supplements" reported in complete texts of the speeches given at the 1973 annual convention, NFIA-COUNTER '73, Oct. 14–16, 1973, Louisville, Ky.) The object of these investigators was to provide liquid supplements with high soluble calcium content and avoid solidification; nevertheless, some of the formulations they prepared did solidify. The formulations that did solidify generally did not have a nutritionally appropriate amount of phosphorus, that is, they contained either too much or too little phosphorus and they contained no magnesium additive. Certain of the other formulations that had nutritionally appropriate amounts of phosphorus did not harden since the phosphorus was supplied as a polyphosphate. (It has been found in the present invention that polyphosphate does not interact with calcium ions at acidic pH to provide a solid product at nutritionally appropriate levels of calcium and phosphorus concentrations, or at convenient temperature and mixing conditions. In addition, when soluble salts of magnesium are introduced into molasses feed supplements at nutritional levels, the mixture will not gel at acidic pH to satisfactory hardness.)

One major problem in the making of animal feed blocks results from the desire to transport and store the feed supplement as a liquid, so that solid blocks can be made from the liquid at remote locations and/or in small lots as the need arises. Sometimes it is more convenient to transport liquid solutions of molasses-containing feed to remote blocking sites for storage than to transport and store molasses blocks. But alkaline sugar solutions degrade rapidly in storage. If the blocks can be rapidly and easily solidified on demand from acidic liquid at remote sites, blocks can be manufactured from the liquid solution at will on site to meet the immediate nutritional requirements of the herd by incorporating extra vitamins, medicaments, and the like. However, to accomplish this goal, the nutritional and blocking agents added to molasses, especially the phosphorus, magnesium and calcium, must be substantially soluble in molasses or aqueous solutions. Molasses solutions prepared with less soluble ingredients, such as magnesium oxide, rapidly separate upon standing with the result that the solutions require constant stirring with power mixers before molasses blocks can be made. Therefore, when it is more convenient to manufacture blocks from stored solutions as needed or to meet the varying needs of the herd for vitamins, and the like, it is desirable to have a method of rapidly and easily preparing such solid feed blocks from substantially homogeneous liquid solutions that gel rapidly.

In addition, it is also desirable to have a method for preparing acidic solid, molasses-based animal feed supplements having nutritionally beneficial contents of phosphorus, magnesium and nitrogen which solidify rapidly when the ingredients are mixed at convenient temperature and which do not subject grazing herds to ammonia poisoning, but do counter the effects of hypomagnesemia during seasons of rapidly growing grasses.

SUMMARY OF THE INVENTION

An acidic feed supplement block is provided, the block being formed from reaction of an acidic liquid mixture comprising (a) a sugar-containing source, such as molasses, (b) an orthophosphate source or precursor, (c) magnesium, and (d) sufficient calcium to provide a total calcium to magnesium weight ratio between about 1.5 and 3.

The solid feed supplement is provided by a method wherein (1) a liquid molasses mixture having an acidic pH is formed by mixing two solutions, at least one of which contains molasses or other sugar-containing source, with the first solution containing an orthophosphate compound, preferably orthophosphoric acid, and the second solution containing a sufficient amount of calcium to react with the phosphate compound in the presence of magnesium so as to form a solid block, and (2) the liquid mixture is allowed to cure and then recovered as a solid-molasses-based feed supplement. To solidify the block, the weight ratio of total calcium to magnesium in the liquid mixture is usually standardized to between about 1.5 and 3 by analytically determining the native content of magnesium and calcium in the molasses, which can differ greatly depending upon the source of the molasses, and adding sufficient additional calcium and magnesium to achieve the desired weight ratio.

BRIEF DESCRIPTION OF THE DRAWING FIGURES

FIG. 1 shows the variation in block hardness with pH for cane molasses blocks containing various amounts of added magnesium, FIG. 2 shows the variation in block hardness with pH for beet molasses formulations containing various amounts of added magnesium, FIG. 3 shows the variation in block hardening with pH for molasses of low native magnesium content at various total weight ratios of calcium to magnesium, FIG. 4 shows the variation of block hardness with pH at different total weight ratios of calcium to magnesium.

DETAILED DESCRIPTION OF THE INVENTION

Figure 1:
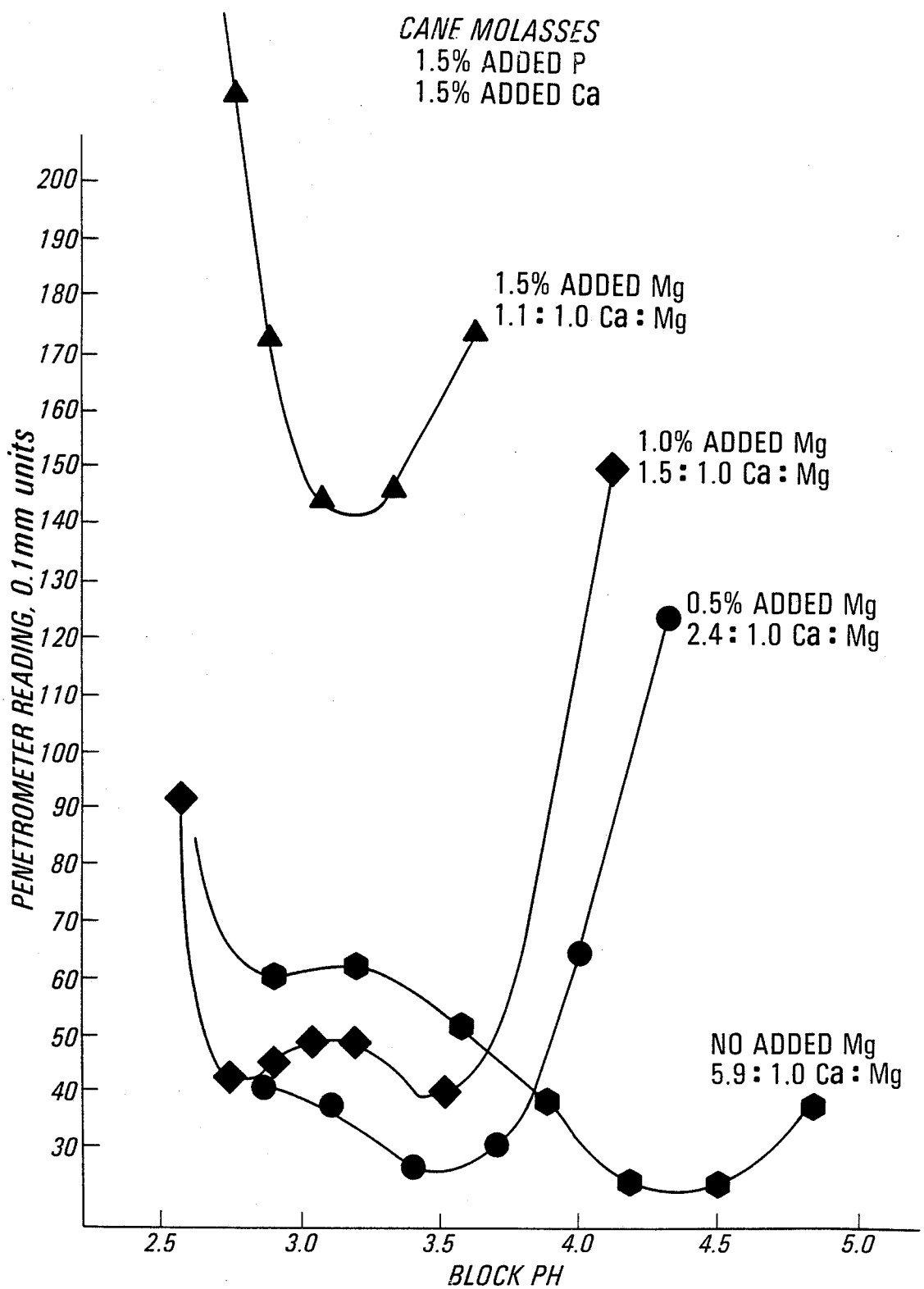
Figure 2:
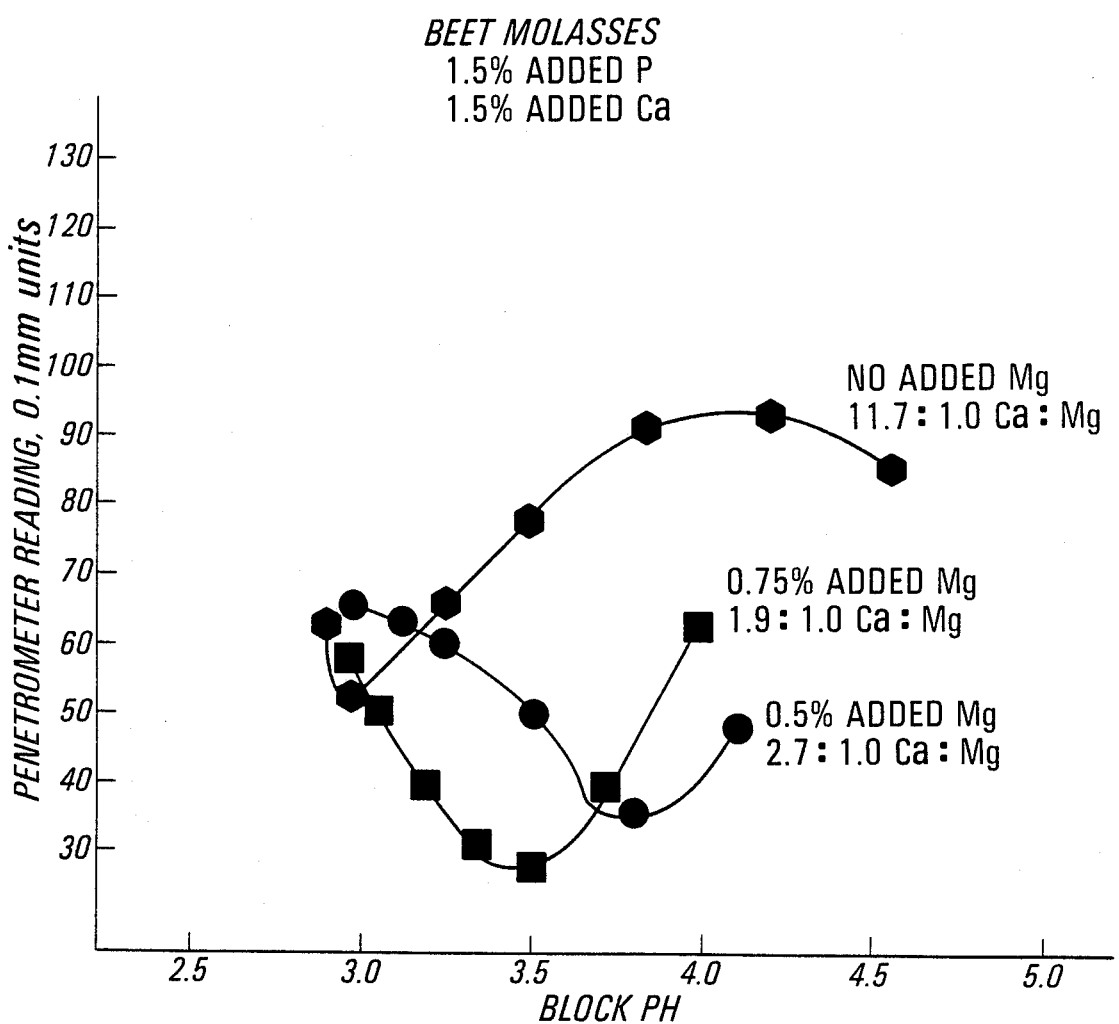

Acidic feed supplement blocks are considered advantageous for controlling the amount of the supplement consumed by free-choice feeding grazing animals. Overconsumption of blocks is both expensive and potentially harmful to the animals, particularly in the case of alkaline blocks. Acidic feed blocks minimize the potential harm to the herd caused by overconsumption of the feed supplement. Acidic feed supplement blocks possess an additional advantage over alkaline blocks if a non-protein nitrogen source, such as urea, is included as a nutrient. In alkaline conditions, such nitrogen sources produce free ammonia in the rumen of the grazing animal during rumination. Free ammonia is readily absorbed into the animal's bloodstream and may cause toxic symptoms or even death, if excessive.

Producing acidic feed supplement blocks has proven surprisingly difficult, especially if concentrations of magnesium greater than about 1.0 weight percent are present. Due to the chemical similarity between magnesium and calcium, the latter of which is routinely used to harden molasses blocks, it would seem that magnesium could readily substitute for calcium as a blocking agent. But it was discovered in this invention that magnesium will not promote the proper blocking (or curing) reactions under acidic pH conditions, particularly of pH values below 4.0. However, in acidic feed blocks containing the usual concentration of calcium as a blocking agent, that is, between about 1 and 2 weight percent of calcium, it was surprisingly found that providing up to about 0.5 to 1.0 weight percent of magnesium produces a block having superior hardness and water resistance.

It is yet another discovery in the invention that, in a calcium-hardened block containing 1 to 2 weight percent of calcium, addition of sufficient magnesium to meet the usual requirements for magnesium as a nutritional supplement, that is, between about 1 and 2 weight percent of magnesium, destroys the hardness of the block at acidic pH. However, it was most surprisingly discovered that this problem could be overcome by adjusting the calcium content so as to provide a calcium to magnesium weight ratio between about 1.5 and about 3.0.

Accordingly, the invention herein resides in the discovery that acidic molasses feed supplement blocks of superior hardness can be made by adjusting the weight percent ratio of total calcium to magnesium to fall within the range between about 1.5 and 3.0. Within this ratio range, acidic blocks of superior hardness and water resistance can be made that contain magnesium in concentrations ranging from the small amounts needed to impart heretofore unsuspected synergistic blocking properties to a molasses mixture to the greater amounts needed to meet nutritional requirements for a magnesium feed supplement.

The present invention is most particularly directed to magnesium-containing, acidic, molasses-based animal feed supplement blocks having sufficient water resistance and hardness to render handling convenient, usually a hardness of less than 80 penetrometer units as measured by a standard grease cone penetrometer (Precision Scientific Co.). The penetrometer reading units are in 0.1 millimeter increments of block penetration. The smaller the readings, the harder the block. Preferably the feed supplement block contains nutritionally beneficial amounts of phosphorus and magnesium and, optionally, non-protein nitrogen. Further, the invention resides in a method for making the acidic molasses-based feed supplement block by reacting two solutions under conditions of agitation. At least one of the solutions contains molasses, but the first solution contains the phosphorus and the second solution contains the calcium. The other ingredients, including magnesium, are dissolved in either or both of the solutions but preferably the magnesium is divided, although not necessarily equally divided, between the two solutions for improved solubility. In particular, care should be taken to prevent super-saturation of either solution with salts.

Differences in the gelling of molasses by type and source of the molasses, such as cane molasses from Hawaii and Central America or beet molasses from California and Idaho, can be explained largely by differences in the native content of magnesium and calcium. A wide-ranging survey of sources of cane and beet molasses indicates that native content of calcium and magnesium may each vary between about 0 and 1 weight percent depending upon the location of the source. Lot-to-lot uniformity within a single source appears to be relatively stable. Generally speaking, it has been discovered in the present invention that the utimate hardness depends upon the total weight ratio of calcium to magnesium. Therefore, in accordance with the invention, the gelling or blocking responses at acidic pH among various strains of molasses can be standardized (or controlled) by adding sufficient calcium and/or magnesium to molasses to bring the total weight ratio of calcium to magnesium in the molasses into the range between about 1.5 to 3.0 which has been found to be critical for hardening at low pH values.

One major problem is encountered in making a feed supplement block containing enough magnesium to counteract the effects of "grass tetany." In the formation of the solid animal feed supplement, it has been unexpectedly found that, while calcium ions interact with phosphate ions to produce gelling of the supplement sufficient to form a stable block, the introduction of magnesium ions into the feed supplement can interfere with the calcium-phosphate blocking reaction sufficiently to make formation of solid feed blocks containing this nutritional additive difficult. It is believed that a competition between calcium and magnesium ions for the available phosphate ions destroys or weakens the blocking reaction. This difficulty, whatever its cause, is overcome and a molasses feed block of predictable hardness can be attained when the total weight ratio of calcium to magnesium in the liquid molasses mixture from which feed supplement blocks are made is standardized to fall within the range between about 1.5 and 3, preferably between about 1.75 and 2.25. By standardizing the weight ratio of calcium to magnesium, a block having a hardness of less than 80 in 0.1 millimeter penetrometer units, i.e. 0.1 mm=1 unit, and containing any desired concentration of magnesium or calcium within the limits of solubility of the molasses used can be obtained. (As used herein the total weight ratio includes both the native and the added magnesium and calcium in the liquid reaction mixture.)

In the present invention the ingredients of the animal feed supplement are divided between two liquid solutions such that, when mixed together, a liquid mixture is provided containing all the desired ingredients of the feed supplement block having a pH below about 4.0 and a calcium to magnesium ratio between about 1.5 and about 3.0. At acidic pH within this range the resultant feed block has a hardness in the desired range, i.e., below about 80 millimeters, and preferably below about 50, and most preferably below about 30 penetrometer units, and the thickening liquid mixture has a viscosity similar to that of thick cream so that it can be readily stirred. Moreover, the gelation reaction proceeds rapidly in this acidic pH range.

The desired ingredients for the animal feed block are dissolved in either or both of the liquid solutions, with one solution containing the phosphate ion and with the other solution containing the calcium in an amount sufficient to achieve the desired ratio of calcium to magnesium in the final reaction mixture. For convenience, it is usually preferred that the molasses be divided equally between the two liquid solutions to be mixed to form the reaction mixture. However, all the molasses can be introduced via the phosphorus-containing solution with the other solution being a brine containing the soluble calcium source. Or the calcium source can be dissolved in the molasses to comprise one solution while the phosphorus source is dissolved in a second, aqueous solution. Other ingredients of the animal feed supplement as taught herein, including magnesium, can be divided between the two solutions or incorporated totally into either solution as desired.

Because the ingredients of both the first and second solutions are eadily soluble in aqueous media, including molasses, the solutions can be transported, stored as separate solutions, and readily mixed together at remote blocking locations as feed blocks are needed. Stored separately, the solutions will remain fresh for as long as about 7 to about 30 days, or longer. When it is desired to convert the two liquid solutions into a solid feed supplement, the two solutions are introduced into a common mixing vessel, such as a vat or even a mold of the shape desired for the final solid block. After moderate to mildly severe agitation for about 10 seconds to about 5 minutes, a substantially homogeneous colloidal gel forms that rapidly cures into a solid having the desired hardness if the pH of the mixture of the two solutions is maintained at a value below about 4.0 pH units. The solution becomes viscous even during mixing and is firm to the touch within a few hours. Within 1 to 5 days, the solution solidifies to a hardness of 80 or less (as determined by a standard grease cone penetrometer in units of 0.1 millimeter) at which hardness it is easily handled and transported. The solution may be allowed to harden in the mixing container, for example, a cardboard drum, or may be poured into another suitable mold for hardening or curing into a cube or cylinder. Additional ingredients such as salt (NaCl); protein meals; non-protein nitrogen, such as, urea, biuret, ammonium salts; fat; vitamins; trace minerals; and medicaments and the like may be incorporated into the resulting solid, molasses-based animal feed supplement by adding such ingredients to the molasses solution prior to hardening.

When introduced to fulfill nutritional requirements, concentrations of ingredients in the final feed supplement usually include between 1 and 2 percent by weight of phosphorus and between 1 and 2 percent by weight of magnesium. Concentrations of calcium are usually determined by the requirements of the calcium to magnesium ratio as taught herein, but increasing the concentrations of both phosphorus and calcium within the range of from 1 to 2 percent will increase both the rate of hardening and the ultimate hardness of the molasses blocks so long as the weight ratio of the total calcium ion to the total magnesium ion in the reaction mixture (including the native calcium and magnesium in the molasses) remains within the critical 1.5 to 3.0 range. Therefore, the preferred concentrations of both calcium and phosphorus are within the range of 1.5 and 2.0 weight percent. At acidic pH less than 4.0, a ratio of calcium to magnesium below about 1.5 or above 3.0 will result in unsatisfactory gelation of the feed block. It is especially important to utilize the above preferred ranges of pH, ingredient concentrations, and calcium to magnesium ratios when the total solids content of the molasses-based animal feed supplement is low as when, for example, a low BRIX molasses, for example below about 75° BRIX, is utilized as the molasses source.

Molasses is commercially available as an aqueous solution having a solids content rated at about 60° to 90° BRIX and a consistency varying from a thin to a thick syrup. (Cane molasses is usually 80°-90° BRIX. Beet molasses is usually 75°-85° BRIX. Other molasses, e.g. wood and citrus, may be lower, about 60°-70° BRIX.) While molasses from different sources may differ in both the identity and amount of non-sugar and colloidal materials contained therein (such non-sugar and colloidal materials may coprecipitate or form solution aggregates with the calcium, magnesium, and phosphate gel and thereby affect the rate of hardening and the ultimate hardness), the molasses utilized in the method of the instant invention may be any sugar-containing molasses, such as cane or blackstrap molasses, beet molasses, corn molasses, wood sugar molasses, citrus molasses, and the like. Molasses having a solids concentration between about 60° and 90° BRIX can be used, but preferably, molasses of higher solids concentration, for example, from 75° to about 90° BRIX, is utilized since a higher solids content increases the ultimate hardness of the blocks or requires less phosphorus, magnesium, and calcium to obtain equivalent hardness. The most preferred molasses is cane or beet, since these are the most abundant molasses available in commerce. The method of this invention may alsb be used to solidify other aqueous sugar solutions, such as refined sugar syrups, although the lack of active non-sugar and colloidal material in such aqueous sugar solutions may make solidification less effective than with molasses.

The phosphate compound used to adjust the phosphorus content of molasses to provide the phosphorus-containing molasses solution may be any suitable feed-grade, water-soluble phosphate or phosphoric acid having a simple phosphate group, that is, an orthophosphate. Polyphosphates, i.e., compounds having more than one phosphate group condensed per molecule, have been found to hinder the rate of hardening and ultimate hardness of molasses solutions; therefore, absence of polyphosphates is preferred. While not wishing to be bound by theory, it is believed that polyphosphate compounds sequester magnesium and calcium ions and render them useless for hardening the phosphorus-containing molasses solution. Similarly, other calcium and magnesium sequestrants, such as lactic and citric acid, should be avoided since they either sequester ions or compete with the hardening reaction of the calcium and mageesium ions and the orthophosphate compound. Since sequestrants will usually reduce the available calcium and magnesium in proportion to their presence in solution, sequestrants will usually have no effect upon the calcium to magnesium weight ratio of available ions. In addition precipitants for calcium and magnesium should be avoided, especially sulfate, hhich precipitates calcium ions. (Additional calcium and magnesium ions may be provided to compensate for those sequestered or precipitated; however, this is economically inefficient.)

Useful phosphoric acids include electric furnace (white) phosphoric acid, or defluorinated wet-process (green) phosphoric acid, which can be of any commercially available grade such as the commonly available concentration range of from 50 to about 55 weight percent expressed as $P_2O_5$ corresponding to a concentration of orthophosphoric acid of about 70 to 75 weight percent. Examples of water-soluble phosphates which can be used are ammonium or alkali metal phosphates, such as mono- or diammonium orthophosphate, monopotassium orthophosphate, etc Polyphosphoric acid can also be employed as a means to increase formula dry matter since it easily dissolves in molasses or in aqueous urea solutions or in any other aqueous solution to be added to the molasses, provided sufficient time is allowed at low pH for hydrolysis to orthophosphate. The most preferred source of phosphate is orthophosphoric acid since it is an easily handled, high assay liquid and is a readily available item of commerce. When a phosphoric acid is used as the source of phosphate, typically 2 to 5% ammonium hydroxide (29% $NH_3$) is needed to provide the optimum pH. Finally, orthophosphoric acid functions as a preservative, fly-repellant, intake control agent and is a pH modifying agent for ammonia produced during urea digestion by ruminant animals. In addition, certain other sources of orthophosphate are suitable, such as mono- and disodium phosphate and calcium dihydrogen phosphate.

As discussed above, the orthophosphate compound is added to the molasses in an amount sufficient to provide from 1 to 2 weight percent, preferably 1.5 to 2 weight percent of phosphorus (calculated as P) in the final solid product. Less than about 1 weight percent of phosphorus in the solid, molasses-based animal feed supplement is inadequate for a solid block formation and is marginal from a nutritional standpoint. Although phosphorus contents greater than about 2 weight percent may be used, such high concentrations may exceed nutritional requirements for cattle, at typical block consumption rates. Therefore it is not appropriate from an economic standpoint to exceed 2 weight percent of phosphorus. Also, the hardness of the solid molasses blocks produced by the method of this invention is not increased appreciably by the excessive phosphorus.

For best results the magnesium source is water soluble so that reaction with phosphate and soluble calcium during gelation proceeds simultaneously. Therefore, magnesium compounds, such as magnesium oxide, insoluble in virtually all aqueous media are unsuitable for use in the composition and method of this invention. Typically, magnesium chloride, as well as the magnesium salts of the lower molecular weight organic acids, for example, magnesium acetate and magnesium propionate, may be used, as well as other magnesium-enriched products, such as magnesium lignosulfonate and magnesium sulfate. Of the above magnesium compounds, magnesium chloride is the most preferred since this source of magnesium ion is inexpensive and very soluble in water, aqueous urea solutions, and sugar syrups such as molasses. Mixtures of the above magnesium salts are also conveniently used. The amount of magnesium employed, including the native magnesium, is usually from about 0.5 to about 2.0 weight percent of the solid molasses block of this invention, expressed as magnesium, and preferably is from about 1.0 to 2.0 weight percent for nutritional purposes.

The calcium source is usually water soluble although compounds such as calcium oxide, which is soluble in molasses but not in typical aqueous media may be used in the invention. Preferably, calcium chloride, as well as the calcium salts of the lower molecular weight organic acids, for example, calcium acetate and calcium propionate, are used, as well as other calcium-enriched products, such as calcium lignosulfonate. Of the above calcium compounds, calcium chloride is the most preferred since this source of calcium ion is inexpensive and very soluble in water, aqueous urea solutions, and sugar syrups such as molasses. Mixtures of the above calcium salts are also conveniently used. The amount of calcium employed depends upon the total amount of magnesium in the reaction mixture. Sufficient calcium is added so that the weight percent ratio of calcium to magnesium falls within the range between about 1.5 and about 3, preferably between about 1.75 and 2.25. Like the phosphorus content, the preferred calcium ion concentration, for rate of hardening and ultimate hardness, also depends on the total solids of the molasses-containing animal feed supplement.

It has been found that in the pH range below about 4.0 pH units maximum hardness for the solid molasses feed supplements of this invention is attained when the total ratio of calcium ion to magnesium ion per weight basis in the product feed block is between about 1.5 and 3, and preferably between about 1.75 and 2.25. Therefore, after determining by conventional analytical methods the native concentrations of magnesium and calcium in the molasses to be used, sufficient amounts of each are added so that the calcium and magnesium concentrations in the final reaction mixture (and resultant feed block composition) fall within the critical range of calcium to magnesium ratios necessary to promote rapid gelation and desirable hardness.

The calcium solution may be added to the phosphorus-containing molasses as an aqueous solution or brine. Or calcium and magnesium may be added as components of any other aqueous liquor to be added to the phosphoruscontaining molasses solution, for example, with the aqueous urea solution. With high shear input, calcium chloride and/or magnesium chloride might be incorporated in dry form, such as flakes. High shear is required to disintegrate and disperse the solid flakes. Preferably, for ease of mixing, the calcium and magnesium are predissolved in molasses. Most preferably a molasses solution containing from about 2 to about 4 percent calcium is prepared to be combined with an equal volume of a phosphorus-containing molasses solution.

The pH of the reactant solution, that is, the solution resulting from combining the phosphorus-containing solution with the solution containing the calcium source, is adjusted to a value preferably less than about 4.0, more preferably less than 3.75, and most preferably between 1.5 and 3.75 pH units using a pH-modifying agent. The pH-modifying agent can be either acidic or basic as needed to adjust the pH within the desired range, depending upon the initial pH of the solution. For example, if orthophosphoric acid is used as the phosphorus source, as in the preferred embodiment, a basic pH-modifying agent, either as an aqueous solution or anhydrous, preferably ammonia, can be used to adjust the pH. Other water-soluble bases may be used, such as the alkali metal hydroxides, for example, sodium and potassium hydroxides. Ammonia is preferred for its low cost and because it contributes to the protein equivalent of the resulting solid animal feed supplement by providing nitrogen that can be converted to amino acids by ruminant feeders. If an acidic pH modifying agent is required, hydrochloric and acetic acids are inexpensive to use and are, therefore, preferred, but any water-soluble hydrogen ion source can be used. However sulfuric acid is usually used sparingly to minimize the presence of sulfate in the reaction mixture.

The pH is measured after homogeneously combining all of the ingredients utilized in the solid molasses blocks of this invention. However, if the pH is to be adjusted with ammonia, such adjustment is usually made prior to addition of the calcium source. Adding ammonia to a solution containing added calcium ions produces an inferior solid, molasses-based animal feed supplement due to formation of precipitates at localized areas of high alkalinity prior to uniform dispersion of the alkaline ingredient. Therefore, if calcium chloride, either as a solid or as an aqueous solution, is the source of calcium, the pH of the phosphorus-containing solution is preferably adjusted with ammonia to somewhat greater than the pH of the resulting reactant solution so that, when the calcium chloride is ultimately combined with the phosphorus-containing solution, the desired pH is attained in the reaction mixture.

In the preferred embodiment described below, a calcium-containing molasses solution is combined with a separate phosphorus-containing molasses solution. Therefore, in this embodiment the orthophosphate is dissolved in a first molasses solution at a concentration higher than 2 percent by weight, and the excess phosphorus content is diluted to the correct concentration by the calcium-containing molasses solution. For example, if equal volumes of the orthophosphate-containing molasses solution and the calcium-containing molasses solution are to be combined to provide a solid product, then from 2 to 4 percent, by weight, phosphorus is dissolved in the first molasses solution to yield a product containing 1 to 2 weight percent phosphorus.

In the preferred method, phosphorus is pre-dissolved in a first molasses solution, mixed with a second, calcium-containing molasses solution, and the pH of the phosphorus-containing molasses solution is adjusted to provide a reactant solution having a pH upon combination of the two molasses solutions as specified above. The magnesium source may be dissolved in either or both molasses solutions.

The optimum pH for any given molasses is the acidic pH at which the molasses feed supplement block achieves greatest hardness and varies somewhat from one molasses to another. Although molasses feed supplements containing the desired nutritional amounts of nitrogen, phosphorus and magnesium can be gelled at higher pH values, for example at around 4.5 pH units, and above, the supplement mixture becomes so viscous (the consistency of paste) at such elevated pH values that mixing requires factory scale equipment. In addition, the expense of energy and equipment required to stir a highly viscous liquid is uneconomical. In any event, where small scale mixing operations are contemplated, for example at remote blocking locations, operation in the pH range below 4.0 using the calcium to magnesium ratios required in this invention enables the use of small scale mixers capable of providing no more than moderate to mildly severe agitation to solutions of moderate non-Newtonian viscosity (the consistency of thick cream).

The result of nonuniform dispersion is a nonhomogeneous product which may have localized fluid and solid regions. But shearing agitation, as obtained with a Lightnin Mixer, is adequate to prepare small laboratory batches of the mixture of the two solutions; however, prolonged shearing or remixing after 15 to 30 minutes standing should be avoided since the gel formed by the interacting orthophosphate, magnesium, and calcium ions may be disrupted prior to setting into a hard product. Hand-mixing of small batches has even been found to be adequate if the calcium and magnesium are predissolved in a molasses solution. In general, mixing for 10 seconds to 5 minutes with a Lightnin Mixer or 1 minute to 5 minutes by hand is adequate to combine the phosphorus-magnesium molasses solution with a calcium-magnesium molasses solution, as in the preferred embodmment, so as to render a uniform gel that will cure into a solid product.

However, if the calcium is added as a brine, for example an aqueous solution containing 50 percent by weight of calcium chloride, more intense mixing may be required. It may be desirable to avoid the addition of water, particularly when using a high water content molasses to achieve increased hardness in the resulting solid molasses blocks. Thus, calcium chloride (or other source of calcium ion) might be added as a solid or a very concentrated solution. But in this embodiment, high shear mixing, as from a turbine or centrifugal pump or an in-line mixer, may be required. In a continuous operation an in-line mixer, for example, a high speed rotor, inside a flow-through tube is suitable.

The phosphorus and calcium-containing solutions described above may be mixed in the mold used to form the solid product of this invention or the resulting mixture may be mixed and then poured or otherwise introduced into molds. The mixture will thicken rapidly upon combining the two solutions so that at most within 30 minutes after the ingredients have been combined the mixture should be poured into forms selected to impart the desired solid block form. Any size molds can be used, but for ease of handling, molds providing solid blocks of from 30 to about 100 pounds, preferably from about 50 to about 55 pounds, can be used. But blocks as large as 500 pounds or greater can also be manufactured using this method. These blocks can be cylindrical, cubic, or any other suitable shape. In one embodiment, the thickening mixture is introduced into corrugated cardboard boxes which are closed, sealed, and stored for a sufficient time to permit the liquid to solidify or cure, typically for a period of 1 to about 5 days. After the blocks have cured, the resultant packages can be palletized, and the like, for shipment and storage.

The temperature at which the above solutons are combined, as well as the temperature at which the resultant solution is cured, affects the hardening rate. In general, increasing temperature facilitates mixing and increases the curing rate. For example, it has been found that if the molasses blocks are cured at 40° F., maximum hardness is attained after 3 to 4 weeks of curing, but when cured at 70° to 80° F., maximum hardness occurs after 5 to 7 days, and at 105° F. only 1 to 2 days are required to attain maximum hardness. Preferably, the resulting mixture is agitated and subsequently cured at a temperature of from 60° to 110° F., more preferably at from about 75° to about 110° F. A higher temperature, within the above range, will provide benefits for the mixing step of this invention in two ways. First, the resulting decrease in the fluid viscosity of the mixture makes for better mixing. Second, the rate of hardening of the mixture is increased by increasing temperature. Particular advantage of the temperature effect in the mixing step can be taken by using solid calcium chloride and/or other additives that provide a significant heat of solution, such as anhydrous additives, to raise the temperature of the reaction mixture. To take advantage of these temperature effects in colder climates, one or both of the aqueous solutions can be preheated, and the liquid-containing molds can be stored in a heated area during the curing period. However, care should be taken to avoid temperatures in excess of about 110° F. since molasses decomposition reactions may ensure at temperatures above that point.

The solid, molasses-based animal feed supplements prepared by the method of this invention desirably include other nutritionally suitable ingredients. For example, fats and oils may be employed in the invention as a source of animal edible fat. Optionally, edible fats and oils from animal and vegetable sources (which can be liquids or solids at room temperature) can be included in the solid, molasses-based animal feed supplements of this invention. The solid compositions can contain from 2 to about 30, preferably from 5 to about 20, weight percent of edible fat These fats include various fatty acids, such as stearic, palmitic, oleic, linoleic, and lauric, and the mono-, di-, or triglycerides of these fatty acids. Useful fats and oils can also include complex lipids, such as the phospholipids, for example, fatty acid esters of glycerol, phosphate or lecithins, which also contain nitrogen bases, such as choline. The fats are commonly identified by source and suitable fats which can be employed include the oils, tailings, or refining residues from the following sources: soybean oil, cottonseed oil, sesame oil, rapeseed oil, olive oil, corn oil, tallow, fish oil, coconut oil, and palm oil, and the like. Preferably, relatively inexpensive sources of fats are employed, such as yellow grease compositions, restaurant fats and greases, acidulated soap stocks or acidulated fats and oils. Such fats may also contain an antioxidant in an effective amount to inhibit oxidative degradation of the fat, for example, from 0.01 to about 1 weight percent of butylated hydroxyanisole, butylated hydroxytoluene, 4-hydroxymethyl-2, or 6-di-tert butylphenol, among others.

An emulsifying agent can be included to stabilize the composition and prevent separation of the fat ingredient during storage of liquid solutions and manufacture of the product. Weeping of the fat ingredient from the solid block after its formation can also be prevented by employing an emulsifying agent at a concentration of from about 0 to about 2 weight percent. Preferred emulsifying agents are the colloidal clay gellants, for example, attapulgite, bentonite, and sepiolite, which also function to increase the hardness of the solid product of this invention.

The solid, molasses-based feed supplement of this invention also may contain a nonprotein nitrogen source, such as ammonia, urea, biuret or mono- or diammonium phosphate to supply a part of the nitrogen dietary requirements for ruminants. (Note that ammonia may also be used for pH adjustment and ammonium phosphate may provide orthophosphate. Thus, these sources of nonprotein nitrogen are dual functional.) The preferred nonprotein nitrogen source is urea, which can be added to provide a concentration from about 1 to about 15 weight percent, and preferably from about 5 to about 10 weight percent based on the solid, molasses-based feed supplement of this invention. Generally, the feed supplement will contain no more than about 40 weight percent equivalent protein content from a non-protein nitrogen source. Since the molasses also contributes from 1 to about 3 weight percent of utilizable nitrogen, the maximum amount of urea or other nonprotein nitrogen source may be reduced by the amount of nitrogen contributed by the molasses.

Various trace nutrients, drugs, and vitamins can also be incorporated in the solid, molasses-based animal feed supplements of this invention, including vitamins A, D, and E, tocopherols, as well as antioxidants for these materials, such as ethoxyquin (1, 2-dihydro-6-ethoxy-2,2,4-trimethyl quinoline). Appropriate medicaments may be incorporated on an "as-needed" basis. The quantity and concentration of these medicaments must, of course, be in accord with established FDA regulations governing their use.

The following table sets forth the typical concentrations of ingredients for the compositions of the invention:

TABLE I

| COMPONENT | CONCENTRATION (Wt. %) |
|---|---|
| 1. Molasses | 60–87 |
| 2. Fat | 0–30 |
| 3. Orthophosphate (as P) | 1–2 |
| 4. Calcium (as Ca) | 1–4 (as required for Ca:Mg from 1.5–3.0) |
| 5. Magnesium as (Mg) | 0.5–2 |
| 6. Emulsifier | 0–1 |
| 7. Starch, clay or other thickeners or gellants | 0–2 |
| 8. Equivalent Protein derived from non-protein nitrogen sources | 0–40 |
| 9. Trace Minerals, vitamins | 0–1 |
| 10. Salt (NaCl or KCl) | 0–10 |
| 11. Medicaments | (as approved) |
| 12. Basic or Acidic Materials for pH adjustment | (as required) |

The above ingredients are preferably combined with molasses or with either of the aqeuous solutions prior to pH adjsutmetn since certain of these ingredients will have pH effects of their own.

The invention is further illustrated b yteh following examples which illustrate specific modes of practicing the invention and are not intended as limiting the scope of the appended claims. Unless stated otherwise, the ingredients are in gram units and the percents are weight percents. Where a solution is referred to, it is understood that the solution is aqueous.

EXAMPLES 1 AND 2

To compare the hardness characteristics of typical molasses block compositions containing varying amounts of magnesium, two molasses block systems were studied, one using cane molasses and one using beet molasses In each molasses block system, he formulation contained about 70 weight percent molasses, 1.5 weight percent of phosphorus from orthophosphoric acid, 1.5 weight percent of calcium from calcium chloride, 20 weight percent of protein equivalent from urea (and ammonia used to adjust pH), and 0 to 5 weight percent of sodium chloride along with sufficient magnesium chloride to provide magnesium in zero, 0.5, 1.0 and 1.5 weight percent concentrations in the cane molasses system and zero, 0.5 and 1.5 in the beet molasses system.

Equal weight portions of the calcium-molasses and phosphorus-molasses stock solutions (shown in Table 2) were blended usingaa Lightnin mixer to maximize colloidal dispersion of the reacted ingredients. The mixture was poured into 200 gram molds and cured for two days at 105° F. followed by one day at room temperature. Hardness values were measured using a Precision standard grease cone penetrometer having a cone weight of 102.5 grams. The units of the penetrometer readings are in 0.1 millimeter increments of penetration into the molasses block by the tip of the penetrometer's cone. The same method of mixing, curing, and measuring hardness is used throughout the Examples herein.

Formulations used in Example 1, the cane molasses system, are summarized in Table 2 for the 0.5 weight percent added magnesium level. As shown in FIG. 1 for this cane molasses system containing 1.5 weight percent of calcium, the optimum hardness of less than 30 units occurs at a pH of about 3.5 when the total calcium to magnesium ratio is 2.4. Hardness of about 40 units is also achieved at a pH slightly less than 3.5 with a calcium to magnesium weight ratio of about 1.5. Hardness falls off sharply when the calcium to magnesium weight ratio is 1.1, which lies outside the required range of 1.5 to 3.

By contrast, the formulation containing no added magnesium achieves maximum hardness at a pH between 4.0 and 4.5. In this pH range the reaction mixture has the consistency of paste and requires expensive mixing equipment to prepare so that preparation of feed supplement blocks at remote sites is thereby rendered impracticable. In addition, it should be noted that, although this formulation achieves the requisite hardness, it contains no added magnesium. The native calcium and magnesium contents of the cane molasses used here are 0.63% Ca and 0.44% Mg.

TABLE 2

| FORMULATION FOR EXAMPLE 1 | | |
|---|---|---|
| | P Stock Wt. % | Ca Stock Wt. % |
| 50% Urea Solution | 11.0 | 11.0 |
| Phosphoric Acid (23.8% P) | 12.6 | — |
| Cane Molasses (84° BRIX) | 70.6 | 70.9 |
| Calcium Chloride (29.2% Ca) | — | 10.3 |
| Magnesium Chloride Brine (8.6% Mg.) | 5.8 | 5.8 |
| Water | — | 2.0 |

29% ammonia added for pH adjustment.

Example 2 uses a beet molasses block formula substantially identical in formulation to the cane molasses system of Example 1, as is shown in Table 3. The native contents of calcium and magnesium are 0.3 weight percent of calcium and 0.19 weight percent of magnesium. The reaction liquid was prepared by mixing in equal weight proportions a first solution containing the phosphorus and one-half of the magnesium and a second solution containing the calcium and the other one-half of the magnesium. Formulations for these solutions are summarized in Table 3 for 0.75 weight percent of added magnesium.

In the absence of magnesium, optimum hardness occurs over a very narrow pH range (about 2.9 to 3.0, pH units). However, with addition of magnesium and adjustment of the calcium to magnesium ratio to fall within the required range, hardness increases and the effective pH range broadens, ranging from about 3.0 to 4.0 pH units. In this system, maximum hardness occurs when 0.75 percent magnesium is used and the pH is about 3.5.

TABLE 3

FORMULATION FOR EXAMPLE 2

|  | P Stock Wt. % | Ca Stock Wt. % |
|---|---|---|
| 50% Urea Solution | 10.0 | 10.0 |
| Phosphoric Acid (23.8% P) | 12.6 | — |
| Beet Molasses (81° BRIX) | 68.7 | 69.0 |
| Calcium Chloride (29.2% Ca) | — | 10.3 |
| Magnesium Chloride Brine (8.6% Mg.) | 8.7 | 8.7 |
| Water | — | 2.0 |

29% ammonia added for pH adjustment.

EXAMPLE 3

To determine the blocking effects of added magnesium without contribution from native magnesium in the molasses, a molasses system was formulated using beet molasses containing very low calcium and magnesium (less than 0.01 weight percent magnesium and 0.04 weight percent calcium). The formulation for this system is shown in Table 4. The calcium to magnesium ratio of this beet molasses formulation containing no added magnesium is very high, greater than 123.

TABLE 4

FORMULATION FOR EXAMPLE 3
(NO ADDED MAGNESIUM)

|  | P Stock Wt. % | Ca Stock Wt. % |
|---|---|---|
| 50% Urea Solution | 10.0 | 10.0 |
| Phosphoric Acid (25.4% P) | 11.3 | — |
| Salt | 10.0 | — |
| Beet Molasses (87° BRIX) | 61.4 | 68.3 |
| Calcium Chloride (29.2% Ca) | — | 8.4 |
| Water | 6.8 | 13.3 |

29% ammonia added for pH adjustment.

A second formulation was prepared from the same beet molasses to contain 1.5 weght percent phosphorus, 1.2 weight percent calcium, and 0.6 weight percent of added magnesium, giving a weight ratio of calcium to magnesium of about 1.9. The formulation for the beet molasses system containing added magnesium is shown in Table 5.

TABLE 5

FORMULATION FOR EXAMPLE 3
(ADDED MAGNESIUM)

|  | P Stock Wt. % | Ca Stock Wt. % |
|---|---|---|
| 50% Urea Solution | 10.0 | 10.0 |
| Phosphoric Acid (23.8% P) | 12.6 | — |
| Salt | 10.0 | — |
| Beet Molasses (87° BRIX) | 58.2 | 65.6 |
| Calcium Chloride (29.2% Ca) | — | 8.4 |
| Magnesium Chloride Brine (8.6% Mg.) | 7.1 | 8.0 |
| Water | 2.1 | 8.0 |

29% ammonia added for pH adjustment.

Figure 3:
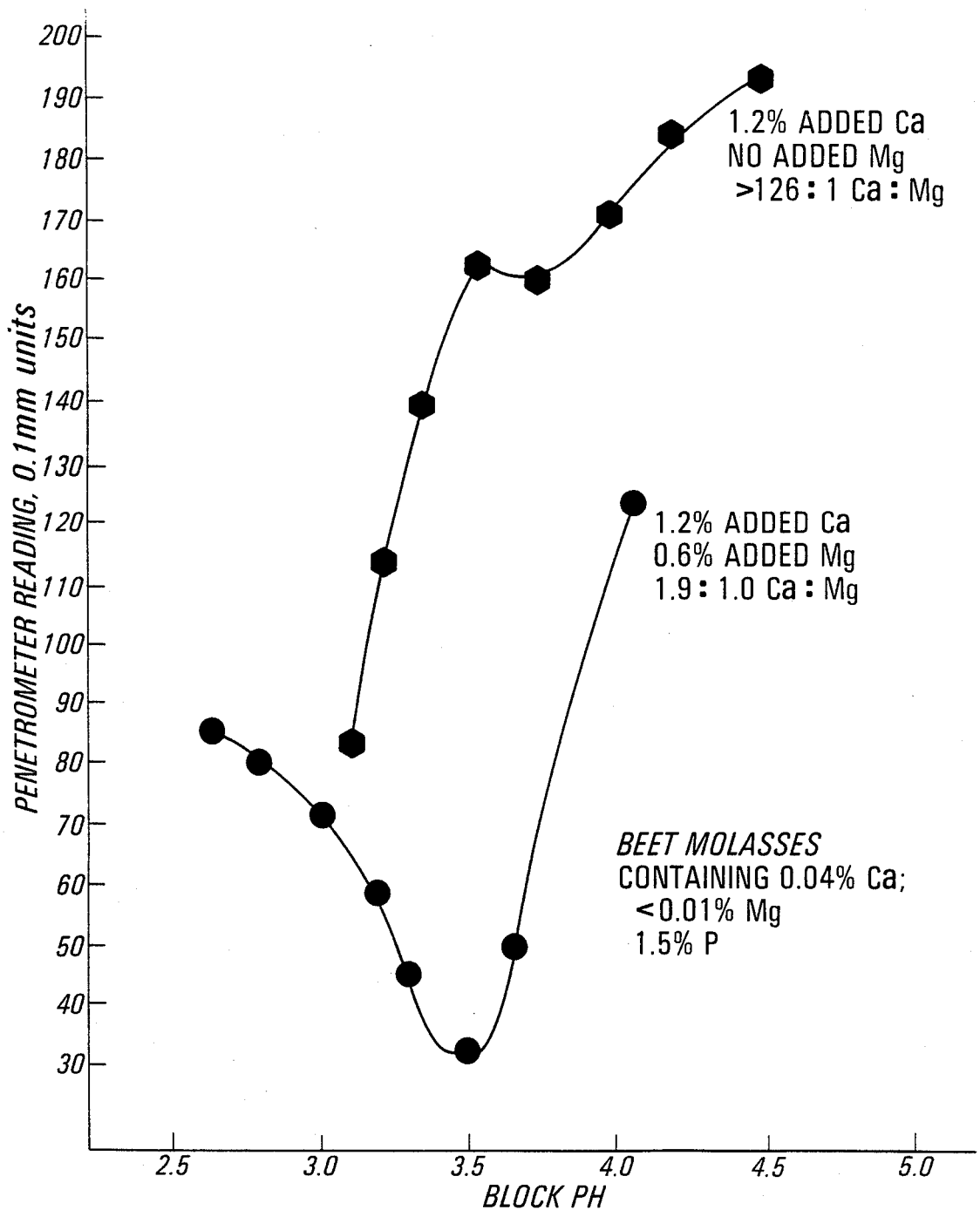

As illustrated in FIG. 3, the formulation containing no added magnesium (Table 4) yields a block having increasing hardness with decreasing pH, but the hardness for those pH values tested was consistently less than the comparable magnesium-containing formulation. By contrast, the formulation containing 0.6 weight percent of added magnesium (Table 5) yields a block having a hardness of about 30 units when the pH is about 3.5. At lower pH, the hardness of the block falls off. This example shows that by adjusting the calcium to magnesium weight ratio to 1.9, an acid magnesium-containing molasses block can be obtained having a hardness of about 30 units, which is much harder than the block containing no magnesium.

EXAMPLE 4

Figure 4:
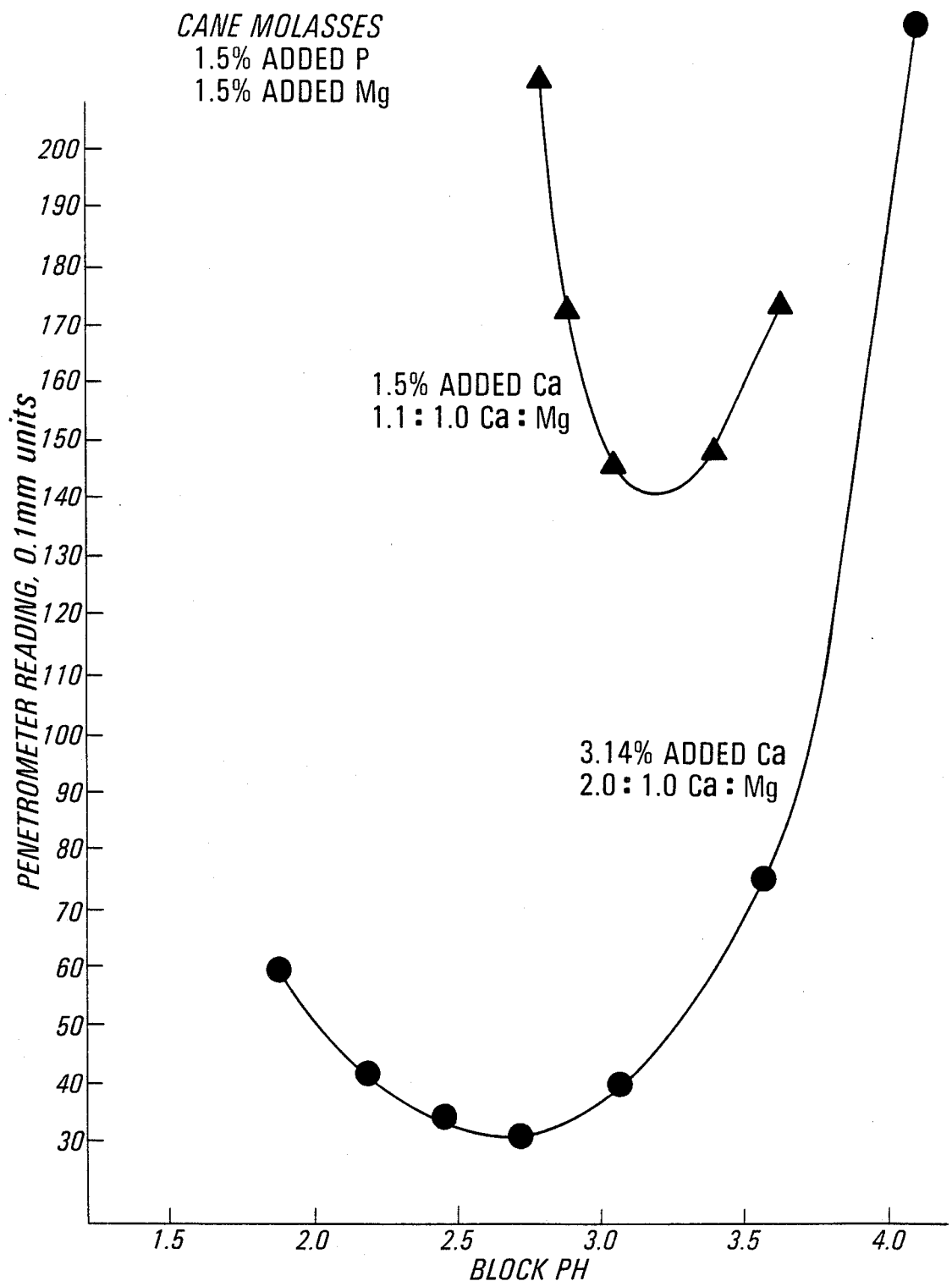

To demonstrate that within the critical pH range gelation depends upon maintaining a favorable ratio of calcium to magnesium rather than upon the content of calcium or magnesium alone, the inferior formulation from Example 1 containing 1.5 weight percent of magnesium was improved by adding sufficient calcium to bring the calcium to magnesium weight ratio to 2, the preferred value within the critical range between 1.5 and 3. As can be seen in FIG. 4, hardness of the block formed from the most unsatisfactory formulation illustrated in Example 1 was restored, with the hardest block (having hardess of about 31 units) being formed from an improved liquid solution having a pH of about 2.7. Formulations used in Example 4 are summarized in Table 6.

This example illustrates that levels of magnesium high enough to meet nutritional requirements (i.e., above 1.0 weight percent) can be incorporated into a molasses block formulation without causing undesirable softening of the block if the weight ratio of calcium to magnesium (including native calcium and magnesium in the molasses) is adjusted to maintain a value within the critical range.

TABLE 6

|  | P Stock Wt. % | Ca Stock Wt. % |
|---|---|---|
| FORMULATION FOR EXAMPLE 4 UNIMPROVED BLOCK (Ca/Mg Wt. Ratio 1.1) | | |
| 50% Urea Solution | 11.0 | 11.0 |
| Phosphoric Acid (23.8% P) | 12.6 | — |
| Cane Molasses (84° BRIX) | 59.0 | 59.3 |
| Calcium Chloride (29.2% Ca.) | — | 10.3 |
| Magnesium Chloride Brine (8.6% Mg.) | 17.4 | 17.4 |
| Water | — | 2.0 |
| IMPROVED BLOCK (Ca/Mg Wt. Ratio 2.0) | | |
| 50% Urea Solution | 11.0 | 11.0 |
| Phosphoric Acid (23.8% P) | 12.6 | — |
| Cane Molasses (84° BRIX) | 59.7 | 46.2 |
| Calcium Chloride (29.2% Ca.) | — | 21.5 |
| Magnesium Chloride Brine (9.0% Mg.) | 16.7 | 16.7 |
| Water | — | 4.6 |

29% ammonia added for pH adjustment.

EXAMPLES 5–12

To determine the best method for measuring the pH of hardened molasses blocks, pH results from two methods of measurement were compared with the pH values of the fresh liquid mixture from which each block tested had been solidified. By the first method, the pH of a 50 weight percent water slurry of the hardened block was measured. By the second method, a surface of the hardened block was dampened just enough to get a pH reading and the reading was recorded. Measurements were made using Corning Model 145 digital pH meter affixed to an Orion Combination Electrode No. 91-36 having a flat bottom.

Readings were made for two sets of molasses blocks, the first set containing no added magnesium but containing 2.6 weight percent of added calcium and 1.6 weight percent of added phosphorus. The second set of blocks has the relatively high content of added magnesium of 1.5 weight percent and also contains 3.1 weight percent of added calcium and 1.5 weight percent of added phosphorus. Results of the pH tests are summarized in Table 7.

TABLE 7

COMPARISON OF pH DETERMINATION METHODS

| Example No. | pH of Fresh Liquid Mixture | pH of 50 Wt. % Water Slurry | pH of Damp Block |
|---|---|---|---|
| GROUP A - NO ADDED MAGNESIUM | | | |
| 5 | 2.7 | 3.4 | 2.8 |
| 6 | 3.8 | 4.0 | 3.6 |
| 7 | 4.5 | 4.7 | 4.6 |
| 8 | 5.2 | 5.6 | 5.4 |
| GROUP B - 1.5 WT. PERCENT ADDED MAGNESIUM | | | |
| 9 | 1.9 | 3.0 | 2.3 |
| 10 | 2.5 | 3.6 | 2.9 |
| 11 | 3.1 | 4.4 | 3.9 |
| 12 | 4.1 | 5.4 | 4.4 |

As can be seen from the data in Table 7, for all molasses containing blocks, when pH of the block is determined by making a 50 weight percent water slurry from the solid block, pH readings are substantially higher than when pH of the block is determined directly by dampening its surface sufficiently to get a pH reading with a flat-bottomed electrode. This is as would be expected considering dilution of the salts present. The differences are most pronounced in the high magnesium, high calcium salt series. Thus, it has been determined that dampened surface pH measurements of hardened blocks are in close agreement with the fresh product liquid and should provide a reliable quality checkpoint. Also, in this invention the pH of the hardened block is determined by dampening the surface of the block to measure the pH.

It will also be noted from the data that the liquid-block pH differential is greater when the block has a large magnesium content than when no magnesium has been added to the block. For this reason the pH of the liquid mixture should usually be adjusted from 0.4 to 0.8 pH units lower than the desired pH of the product high magnesium block.

While particular embodiments of the invention have been described, it will be understood that the invention is not limited thereto since many obvious modifications can be made. It is intended to include within this invention any such modification as will fall within the scope of the appended claims.

I claim:

1. A method for providing a solid, molasses-based animal feed supplement having a hardness of less tahn about 80 in 0.1 millimeter penetrometer units and a phosphorus content between 1 and 2 percent by weight, which comprises:
    (a) adjusting the phosphorus content of a molasses seleted from the group consisting of cane molasses and beet molasses and havign a BRIX of at least 75° by combining said molasses with a concentrated orthophosphoric acid solution to provide a first molasses solution comprising phosphorus in an amount sufficient to provide from 1 to 2 weight percent phosphorus in the solid feed supplement;
    (b) then combining under conditions of agitation (i) from about ⅓ to about 3 volumes of a second molasses solution comprising calcium chloride dissolved in a molasses selected from the group consisting of cane molasses and beet molasses with (ii) 1 volume of said first molasses solution, magnesium chloride being dissolved in the first and second solutions, to provide a reacant solution having a pH within the range from about 1.75 to about 3.75 except when the amount of added dissolved magnesium is less than 1.5 weight percent, the pH is from about 2.75 to about 3.75 the phosphorus, dissolved magnesium, and dissolved calcium present in said first and second solutions being sufficient in concentrations such that said reactant solution comprises from 1 to 2 percent by weight phosphorus, 0.5 to 2 percent by weight of dissolved magnesium, and as sufficient amount of dissolved calcium so that the weight ratio of the total weight of dissolved calcium to the the weight of dissolved magnesium in said reactant solution is between about 1.5 and 3;
    (c) terminating said agitation;
    (d) then curing said reactant solution at a temperature of from about 60° to about 110° F. for a sufficient time to form a solid, molasses-based animal feed supplement having a hardness of less than about 80 in 0.1 millimeter penetrometer units; and
    (e) recovering the solid, molasses-based animal feed supplement.

2. The method of claim 1 wherein said molasses is beet molasses.

3. The method of claim 1 further comprising adding urea to the first solution of step (a).

4. The method of claim 1 further comprising adding urea to the second solution of step (b).

5. The method of claim 1 wherein said reactant solution is substantially free from sequestrants and precipitants for calcium and magnesium.

6. The method of claim 1 wherein said reactant solution comprises from 1.5 to 2 percent phosphorus, by weight.

7. The method of claim 1 wherein equal volumes of said first molasses solution and the second molasses solution are combined to provide the reactant solution.

8. A method for manufacturing a solid, acidic, molasses-based animal feed supplement wherein the animal feed supplement is stored as two separate liquid solutions, said method coprising:
    (a) storing separately a first homogeneous solution containing dissolved phosphorus,
    (b) storing separately a second homogeneous solution containing dissolved calcium, each of said first and second solutions containing molasses and a sufficient amount of dissolved magnesium so that when the solutions are mixed together the resultant mixture has a weight ratio of the total wieght of dissolved calcium to the total wieght of dissolved magnesium between about 1.5 and 3.0,
    (c) mixing together said first and second homogeneous solutions to form said resultant mixture,
    (d) allowing the resultant mixture to cure into a solid, acidic, molasses-based animal feed supplement having a hardness less than about 80 in 0.1 millimeter penetrometer units, and
    (e) recovering the solid, acid, molasses-based feed supplement.

9. The method of claim 8 wherein, the first and second homogeneous solutions are stored separately for at least about 7 days.

10. The method of claim 8 wherein the first and second homogeneous solutions are stored separately for at least about 30 days.

11. An acidic feed supplement block formed from an acidic liquid mixture, said mixture consisting essentially of:
(a) at least 60 weight percnt of molasses, said molasses containing native calcium and native magnesium;
(b) between about 1 and 2 weight percent of dissolved phosphorus;
(c) between about 0.5 and 2 weight percent of added dissolved magnesium;
(d) a sufficient amount of a pH-modifying agent to adjust the pH of the liquid mixture to an acidic pH from about 1.75 to aobut 3.75, except when the amount of added dissolved magnesium is less than 1.5 weight percent, the pH is from about 2.75 to about 3.75.

12. The block of claim 11 wherein said weight ratio is between about 1.75 and 2.25.

13. The block of claim 11 wherein substantially no sequentrants and precipitants for calcium and manesium are present.

14. The block of claim 11 further comprising non-protein nitrogen.

15. The block of claim 11 having a hardness of about 80 or less in 0.1 millimeter penetrometer units.

16. The block of claim 15 wherein the hardness is about 50 or less in 0.1 millimeter penetrometer units.

17. The block of claim 15 wherein said weight the ration is between about 1.75 and 2.25 and the hardness is about 30 or less in 0.1 millimeter penetrometer units.

* * * * *

UNITED STATES PATENT AND TRADEMARK OFFICE
CERTIFICATE OF CORRECTION

PATENT NO. : 4,798,727

DATED : January 17, 1989

INVENTOR(S) : Alex E. Miller

It is certified that error appears in the above-identified patent and that said Letters Patent is hereby corrected as shown below:

Claim 1, col. 17, line 59, "tahn" should be "than"; line 64, "seleted" should be "selected"; line 65, "havign" should be "having"; col. 18, line 10, "reacant" should be "reactant"; line 22, "the", second occurrence, should be "total".

Claim 7, line 45, "the" should read -- said --.

Claim 8, line 67, "acid" should read "acidic".

Claim 11, col. 19, line 10, between "least" and "60", insert --about--; col. 20, line 3, insert --(e) a sufficient amount of added dissolved calcium to provide a weight ratio of the total weight of dissolved calcium to the total weight of dissolved magnesium of between about 1.5 and 3--.

Signed and Sealed this

Twenty-ninth Day of August, 1989

Attest:

DONALD J. QUIGG

Attesting Officer

Commissioner of Patents and Trademarks